May 7, 1935.　　　W. B. BRONANDER　　　2,000,508
SLICING MACHINE
Filed Feb. 27, 1931　　　4 Sheets-Sheet 1

INVENTOR
Wilhelm B. Bronander
BY
Marshall & Hawley,
ATTORNEYS

May 7, 1935.   W. B. BRONANDER   2,000,508
SLICING MACHINE
Filed Feb. 27, 1931   4 Sheets-Sheet 4
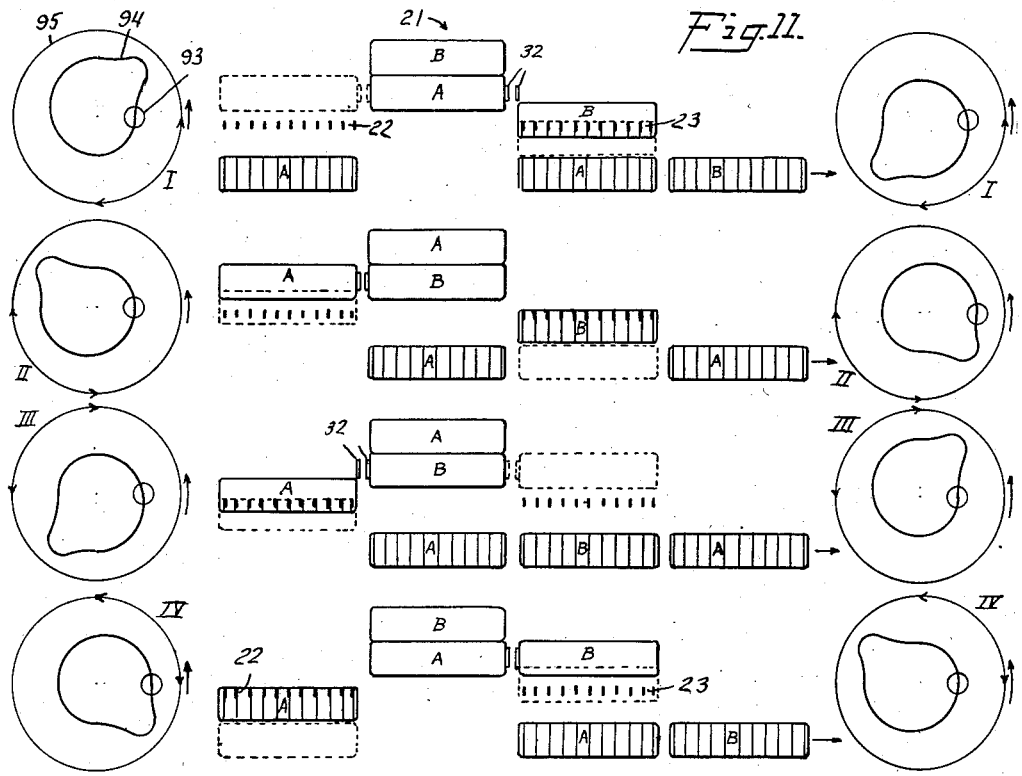
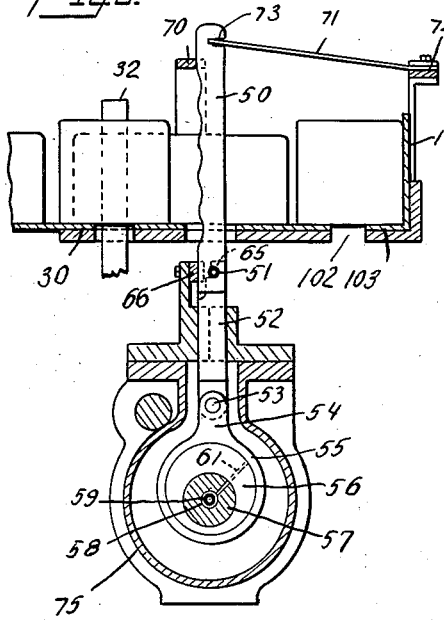
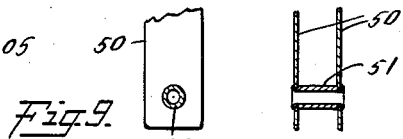
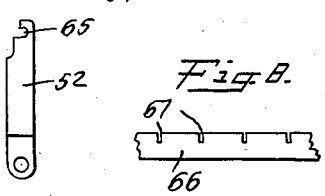
INVENTOR
Wilhelm B. Bronander
BY
Marshall + Hawley,
ATTORNEYS Patented May 7, 1935

2,000,508

UNITED STATES PATENT OFFICE 2,000,508

SLICING MACHINE

Wilhelm B. Bronander, Montclair, N. J.

Application February 27, 1931, Serial No. 518,631

17 Claims. (Cl. 146—153)

This invention relates to slicing machines and particularly to machines for slicing material, such as loaves of bread.

At the present time there is a growing demand in the baking trade for the delivery of loaves of bread in sliced form. It is difficult to slice fresh loaves since the bread is soft and tends to crush under the pressure of the slicing means.

This invention has for its salient object to provide a machine of the character specified that will operate efficiently and will have a maximum capacity or output.

Another object of the invention is to provide a slicing machine so constructed and arranged that the loaves will be automatically fed into and through the slicing mechanism and from this mechanism will be delivered to any desired form of handling or wrapping machine.

Further objects of the invention will appear from the following specification taken in connection with the drawings which form a part of this application, and in which Fig. 1 is a front elevation, partly in section, of a machine constructed in accordance with the invention;

Fig. 5 is a vertical sectional elevation taken through the cutting mechanism;

Fig. 6 is a fragmentary elevation, partly in section, showing a portion of one of the cutting knives;

Fig. 7 is a sectional elevation taken at right angles to Fig. 6;

Fig. 8 is a plan view of a comb or knife retaining strip;

Fig. 9 is an elevational view of one of the links for connecting the reciprocating cutting knives to the reciprocating mechanism for the knives;

Figure 1:
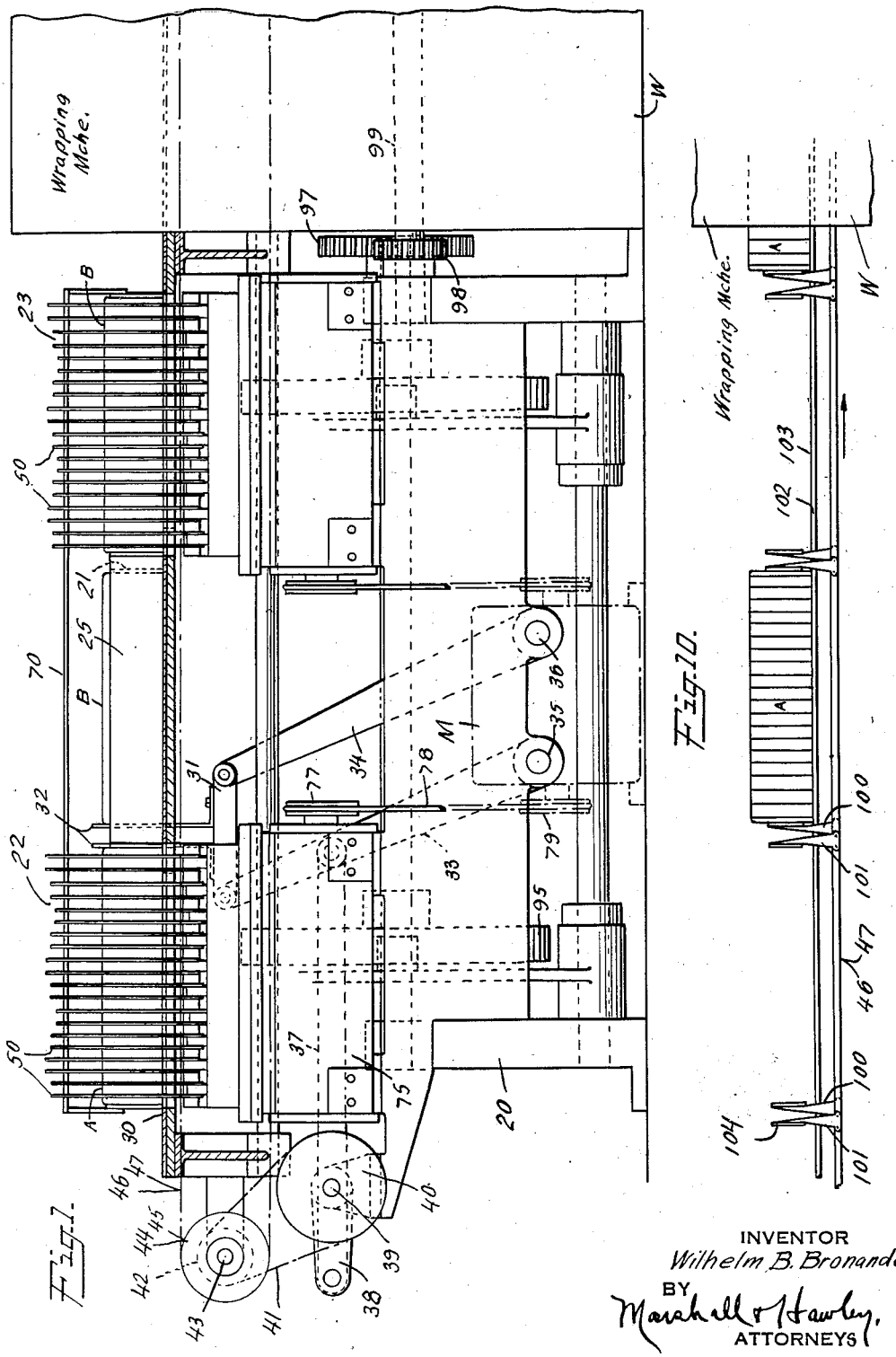
Figure 2:
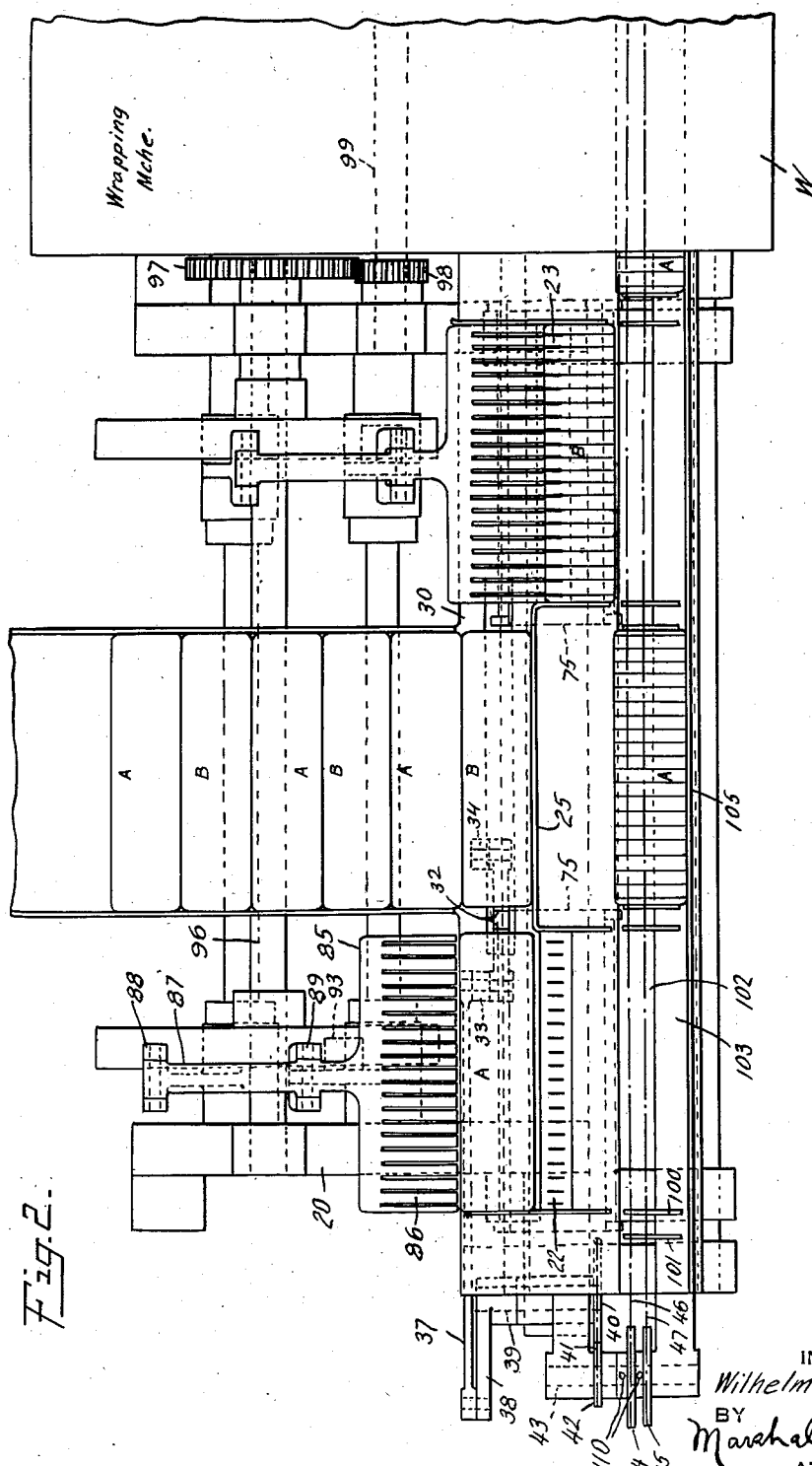
Fig. 2 is a top plan view of the machine shown in Fig. 1.
Figure 3:
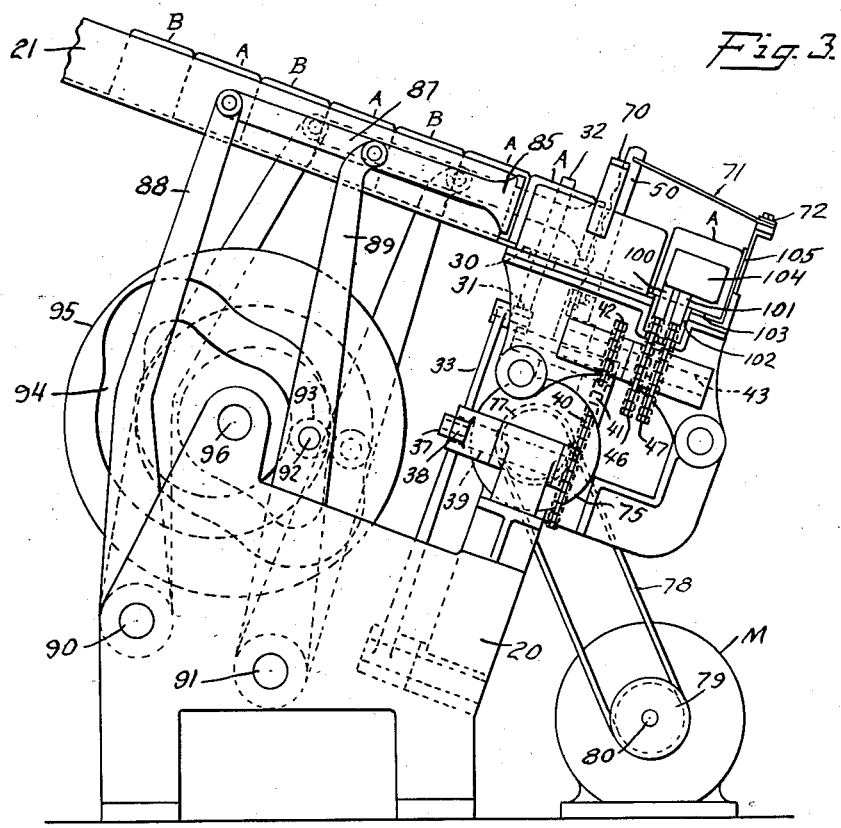
Fig. 3 is an end elevation of the machine shown in Fig. 1.

Fig. 10 is an elevational view, partly in section, showing the feed chains which form the conveyor for delivering the loaves from the slicing mechanism and the method of mounting the abutments for engaging the ends of the loaves; and Fig. 11 is a diagrammatic view illustrating the operation of the feeding mechanism by which the loaves are fed to the slicing mechanisms and are fed therethrough to the conveyor, by which they are delivered to the wrapping or other devices.

The invention briefly described consists of a machine having a guideway or chute for feeding and guiding loaves, two sets of cutting mechanisms arranged on each side of the feeding and guiding chute, means operatable to alternately deliver loaves to the two sets of cutting mechanisms, means for feeding the loaves alternately through the cutting mechanisms and for discharging the loaves on an intermittently operatable conveyor. The feeding devices for feeding the loaves through the cutting mechanisms and the discharge conveyor are so operated and so synchronized in their operation that loaves will be delivered to the conveyor alternately from the two sets of feeding devices and will be deposited in consecutive or successive spaces on the conveyor. It will be obvious that the operations of the feeding devices and the discharge conveyor must be so timed that the loaves will be delivered at the proper period in the operation of the conveyor since the sliced loaves must be supported at both ends.

Further details of the invention will appear from the following description.

In the embodiment of the invention illustrated in the drawings, the machine comprises a frame 20 on which is centrally supported a chute or inclined guideway 21 for conducting the loaves downwardly. At each side of the guideway there is provided a set of cutting knives, indicated at 22 and 23.

At the lower end of the chute 21 is a wall 25 against which the front loaf in the chute will come to rest. Supporting rails 30 extend transversely across the front of the machine and beneath the loaf disposed against the wall 25, these rails being provided for supporting the loaf as it is fed transversely in one direction or the other to one of the slicing mechanisms.

The wall 25 is preferably removably mounted. If it is desired to feed the loaves directly to the conveyor to be conducted to the wrapping machine without slicing, the shelf can be removed, permitting the loaves to reach the conveyor from the chute 21.

The loaves are alternately fed to the right and to the left by means of mechanism illustrated particularly in Fig. 1. This mechanism consists of a block 31 having a pair of plates or brackets 32 extending upwardly therefrom. The block 31 is pivotally mounted on the upper ends of a pair of parallel arms 33 and 34, which in turn are pivotally mounted at their lower ends on fixed pivots 35 and 36. A link 37 connects the arm 33 to a crank 38 which is mounted on a shaft 39 driven by a sprocket 40. The sprocket 40 is driven by a chain connection 41 from a sprocket 42 mounted on a shaft 43. The shaft 43 also has mounted thereon a pair of sprocket wheels 44 and 45 on which are mounted chains 46 and 47 which are driven intermittently from any desired driving connections and preferably from a wrapping machine W disposed at the right of the slicing machine and to which the loaves are delivered from the slicing machine. The sprockets 44 and 45 and the chains 46 and 47 form a part of the discharge or delivery conveyor by means of which the loaves are discharged from the wrapping machine. Further details of this conveyor will be hereinafter described.

The sprocket wheels 42 and 40 are so dimensioned that the wheel 40 will be rotated one-half of one revolution for each complete revolution of the sprocket wheel 42. Furthermore, since the sprocket wheels 44 and 45 for driving the conveyor are mounted on the same shaft 43 as the sprocket wheel 42, the drive for the feeding mechanism by means of which the loaves are fed to the cutters will be synchronized with the drive for the conveyor which receives the loaves from the cutting mechanism and conducts the loaves to the wrapping machine.

It will be obvious from the foregoing description that the loaves from the chute 21 will be fed alternately in opposite directions by means of the reciprocating movement of the block 31 and brackets 32 carried thereby. In Fig. 1 the position of the lateral feeding mechanism for the loaves is shown at the left, a loaf having been fed to the slicing devices 22. Upon the next movement of the feeding mechanism the loaf at the bottom of the chute 21 will be fed to the right in position to be sliced by the cutting devices 23.

*Cutting mechanism*

Figure 4:
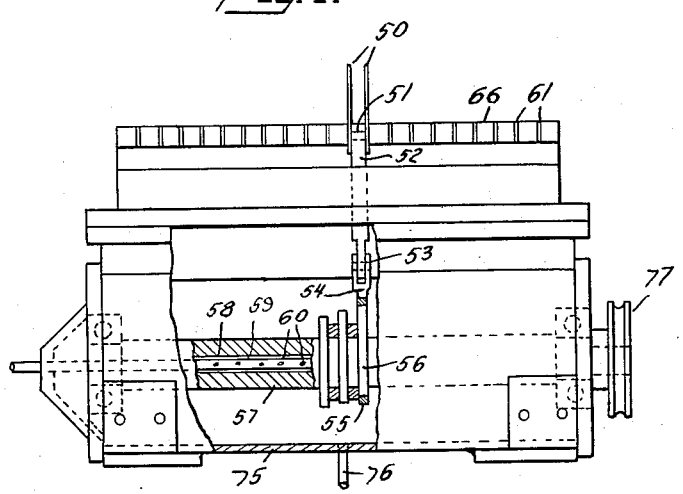
Fig. 4 is a front elevation, partly in section, illustrating the cutting knives.

The cutting mechanism comprises a plurality of blades 50 which are constantly reciprocated in vertical planes. The blades are connected in pairs by means of sleeves 51, as shown in Fig. 7. Each pair of blades is connected at the lower end thereof to the upper end of a link 52 which is pivoted at 53 to a lug 54 carried by an eccentric strap 55 mounted on an eccentric 56. Each of the eccentrics 56 is mounted on a shaft 57 and it will be noted from the showing in Fig. 4 that the eccentrics 56 are angularly displaced around the shaft relative to each other. The shaft 57 has a longitudinal bore or opening 58 therethrough into which extends an oil feed pipe 59 having lateral openings 60 for discharging the oil into the bore 58 of the shaft 57. The oil is conducted from the bore through conduits 61 to the peripheries of the eccentrics 56, thus lubricating the bearing of the eccentric straps on the eccentric.

The links 52 are provided with hooks 65 at their upper ends which receive the sleeves 51 carried by the pairs of blades or knives 50. In order to hold the knives in position on the hooks, a comb 66 having notches 67 is positioned, as shown in Fig. 5, in such a manner that the lower edge portions of the knives will be received by the notches 67 and the comb will hold the knives against movement on the hooked upper ends of the links 52.

A comb 70 is also positioned adjacent the upper ends of the knives which are held in the notches of the comb by means of flat springs 71. Each spring 71 is fixedly supported at 72 and is notched at its free end to receive the two knives of the pair. The knives are also preferably notched, as shown at 73.

The oil conduit 59 receives and conducts oil under pressure and the eccentrics are surrounded by a casing 75 which is provided with a return feed pipe 76 for the oil.

The shaft 57 is driven by a pulley 77 which is connected by a belt 78 to a pulley 79 mounted on the shaft 80 of a motor M. The cutting knives are driven continuously.

*Mechanism for feeding loaves through cutters*

The feeding devices for feeding the loaves through the cutters and to the delivery or discharge conveyor are exactly the same in construction for both sets of cutters and differ only in the timing of operation thereof. Each feeding mechanism comprises a feeding head 85 having a plurality of fingers 86 projecting therefrom and spaced apart distances equal to the distances between the cutting blades 50. Each head 85 is carried by a shank or plunger 87 which is pivoted to the upper ends of a pair of arms 88 and 89, the arms being mounted at their lower ends on fixed pivots 90 and 91. One of the arms 89 has projecting laterally therefrom, a stud 92 on which is mounted a roller 93. The roller 93 is disposed in a cam groove 94 formed in a cam 95 carried by a shaft 96. Shaft 96 is provided with a gear 97 which meshes with a gear 98 mounted on a shaft 99 extending into and forming a part of the wrapping machine W. Shaft 99 is driven in any desired manner and through the gear connection described drives the shaft 96.

Since the feeding mechanisms for both sets of cutters are exactly alike except for timing, the foregoing description will suffice for both sets of feeding devices. Both cams 95 are mounted on the shaft 96 but one of the cams is angularly spaced 180° from the other cam.

It will be obvious from the description in the preceding paragraphs that the engagement of the cam 95 with the roller 93 of one of the arms 89 will determine the movement of the plunger or shank 87 and therefore of the feeding head 85 and fingers 86. The sequence of operation of the various parts will be described later in the specification with reference to the diagrammatic showing in Fig. 11.

*Conveyor mechanism*

The conveyor for delivering the loaves from the slicing machine is more particularly illustrated in Fig. 10, in which it will be seen that lugs or abutments 100 are carried by the chain 46 and lugs or abutments 101 are carried by the chain 47. The sprocket wheels 44 and 45 can be rotatably adjusted on the shaft 43 to any desired angular relation with respect to each other and after adjustment to the desired positions these sprockets are locked by means of set screws 110. It will be obvious that the chain 46 can be advanced or moved to the right relative to the chain 47 and that such a movement will cause the lugs 100 to be moved toward the lugs 101. This will decrease the distance between the lugs 100 and 101 and this change can be made to accommodate different sizes or lengths of loaves. It will be obvious that support must be provided for the two end slices of each loaf as the sliced loaf is fed along the conveyor to the wrapping machine.

The lugs 100 and 101 extend upwardly through longitudinal slots 102 in a shelf 103 and are provided at their upper ends with plates 104 adapted to engage the end slices of the loaves. The shelf 103 is provided at its outer end with a vertical wall 105 against which the loaf is fed by the fingers 86.

Sequence of operations

Fig. 11 illustrates diagrammatically the sequence of operations of the feeding mechanism for feeding the loaves to the two sets of cutters and of the feeding devices for feeding the loaves through the cutters to the conveyor. At the left in this figure are shown four positions of the cam for controlling the movement of the feeding devices at the left of the chute 21, and at the extreme right in this figure corresponding positions are shown for the cam controlling the feeding of the loaves to the cutters at the right of the chute 21. The positions of the cams are shown at 90° intervals in the revolution thereof.

The various positions of the feeding of the loaf through the left hand cutter will first be described. The loaves which are fed to this cutter are designated by the reference character A and in each of the four positions of movement of the loaf and of the cam, the position of the loaf at the beginning of the 90° interval of movement is indicated by showing the loaf in full lines and the position at the end of the 90° interval of movement is shown by dotted lines. The four positions of the cam are indicated by I, II, III and IV, and the direction of rotation of the cam is shown by an arrow. In each case the cam rotates in an anti-clockwise direction, viewing Fig. 11.

At the beginning of the interval of movement of the cam designated by I, the loaf A is disposed at the bottom of the chute 21 and at the end of this movement the loaf is shown in the path of movement of the feeding head and fingers 85, 86. During this portion of movement of the cam the sector of the cam is formed on an arc and the roller 93 is not moved in either direction.

During the portion of the cam movement designated II, the loaf A is moved from a position directly in the rear of the cutter 22 into the cutting blades.

In the interval III, the loaf A has been pushed substantially through the cutting blades 22, and in the interval IV the loaf has been pushed from the cutter 22 onto the conveyor by means of which it is conducted to the wrapping mechanism.

The cam at the right in Fig. 11 is angularly spaced 180° from the cam at the left and the sequence of operation on a loaf as it is fed through the cutters 23 will now be briefly outlined.

In the operation of this cam, the intervals III, IV, I and II correspond to the intervals I, II, III and IV of the cam at the left. Starting with the interval III, the loaf B is fed from the chute to a position to be engaged by the feeding head which feeds the loaf through the knives 23. In the interval IV, the loaf B is fed into the knives 23. In the interval I, the loaf B is fed substantially through the knives 23. In the interval II, the sliced loaf is fed from the knives 23 to the conveyor and is discharged in the space left between the previously discharged loaves A, A.

Particular attention is directed to the fact that a loaf A will be discharged on the conveyor in alternate spaces thereon and the loaves B will be discharged into the intervening spaces on the conveyor. Thus, in Fig. 1, a loaf B is shown in the front or advance space on the conveyor, a loaf A is shown immediately behind the loaf B, the space behind the loaf A being empty, and a second loaf A is shown in the space immediately in the rear of the empty space. During the movement of the cams corresponding to the position II, a loaf B is positioned on the conveyor between the loaves A, A. In the position III, the loaves are shown on the cover in this sequence A, B, A. In the position IV, the conveyor has advanced another step in its intermittent movement and the loaves are disposed thereon in the following sequence, namely, B, A, empty, A.

From the foregoing description it will be seen that the loaves will be fed through the two sets of cutters in sequence, the interval between the operations of the two cams being 180°. Furthermore, the conveyor movement is so timed as to feed the loaves to the conveyor at the end of each slicing operation and in such a manner that the loaves from the two sets of cutters or slicing mechanisms will be arranged alternately, each space of the conveyor being filled by a sliced loaf.

It will be evident from the foregoing specification that a simple, practical and efficient machine has been devised for accomplishing the objects of the invention and that the machine constructed as described will have a maximum capacity or speed of operation.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. A slicing machine comprising a plurality of sets of slicing mechanisms, means operatable to move articles to be sliced into operative position relative to said slicing mechanisms, means for feeding said articles through said slicing mechanisms, and a conveyor, said feeding means operating to feed said sliced articles into alternate spaces on said conveyor.

2. A slicing machine comprising two sets of slicing mechanisms, means operatable alternately to move articles to be sliced into operative position relative to said slicing mechanisms, means for feeding said articles through said slicing mechanisms, a conveyor, and means for imparting an intermittent feed to said conveyor, said article feeding means operating to feed said sliced articles into alternate spaces on said conveyor.

3. A slicing machine comprising means for guiding articles to be sliced, slicing mechanism including a plurality of constantly driven, spaced knives on each side of said guiding means, means operatable alternately to feed articles from said guiding means to said slicing mechanisms, and means for feeding the articles through said slicing mechanisms.

4. A slicing machine comprising means for guiding articles to be sliced, slicing mechanism including a plurality of spaced, reciprocating, knives on each side of said guiding means, means operatable alternately to feed articles from said guiding means to said slicing mechanisms, and means for feeding the articles through said slicing mechanisms.

5. A slicing machine comprising means for guiding articles to be sliced, slicing mechanism on each side of said guiding means, means operatable alternately to feed articles from said guiding means to said slicing mechanisms, a conveyor, and means for feeding the articles through said slicing mechanisms and into alternate spaces on said conveyor.

6. A slicing machine comprising two sets of slicing mechanisms, reciprocatable means operatable alternately to move articles to be sliced into operative position relative to said slicing mechanisms, and reciprocatable means for feeding said articles through said slicing mechanisms.

7. A slicing machine comprising means for guiding articles to be sliced, slicing mechanism on each side of said guiding means, means operatable alternately to feed articles from said guiding means to said slicing mechanisms, and means for feeding the articles through said slicing mechanisms, said last named means operating to feed the articles through said slicing mechanisms at spaced intervals.

8. A slicing machine comprising means for guiding articles to be sliced, slicing mechanism on each side of said guiding means, means operatable alternately to feed articles from said guiding means to said slicing mechanisms, and means for pushing the articles through said slicing mechanisms.

9. A slicing machine comprising two sets of slicing mechanisms, means operatable alternately to move articles to be sliced into operative position relative to said slicing mechanisms, means for feeding said articles through said slicing mechanisms, and a conveyor, means on said conveyor for engaging and supporting the ends of the sliced articles, said feeding means operating to feed said sliced articles into alternate spaces on said conveyor and between said end supports.

10. A slicing machine comprising two sets of slicing mechanisms, means operatable alternately to move articles to be sliced into operative position relative to said slicing mechanisms, means for feeding said articles through said slicing mechanisms, and a conveyor, adjustable means on said conveyor for engaging and supporting the ends of the sliced articles, said feeding means operating to feed said sliced articles into alternate spaces on said conveyor and between said end supports.

11. A slicing machine comprising means for guiding articles to be sliced, slicing mechanism disposed on each side of said guiding means, means operatable alternately to feed the articles endwise to said slicing mechanisms, means for feeding the articles through said slicing mechanisms, and means for feeding the assembled sliced articles endwise away from said slicing mechanisms.

12. A slicing machine comprising means for guiding articles to be sliced, slicing mechanism disposed on each side of said guiding means, means operatable alternately to feed the articles endwise to said slicing mechanisms, means for feeding the articles through said slicing mechanisms, and means operating at right angles to said last named feeding means for feeding the assembled sliced articles away from said slicing mechanisms.

13. A slicing machine comprising two sets of alternately acting slicing mechanisms, means for moving articles forwardly in sidewise contact for delivery to the slicing mechanisms, positive means operatable transversely of said means to move articles alternately horizontally and endwise into operative position relative to said slicing mechanisms, and means for feeding articles sidewise through said slicing mechanisms.

14. A slicing machine comprising two sets of alternately acting slicing mechanisms, means operatable first in one direction to move articles to be sliced endwise into operative position relative to one of said slicing mechanisms, and thereafter in an opposite direction to move a succeeding article endwise to the other of said slicing mechanisms and means for feeding said articles through said slicing mechanisms.

15. A slicing machine comprising a plurality of spaced slicing mechanisms, a guide for the articles to be sliced intermediate said slicing mechanisms, means operatable transversely of the guide first in one direction toward one of said slicing mechanisms to feed articles thereto and thereafter in the opposite direction toward another of said slicing mechanisms to feed articles thereto, and means for feeding the articles through said slicing mechanisms.

16. A slicing machine comprising two sets of alternately acting slicing mechanisms, positive means operatable transversely of said means to move articles alternately horizontally and endwise into operative position relative to said slicing mechanisms, means for feeding said articles sidewise through said slicing mechanisms, and conveyor means synchronized with the last named means for intermittently receiving the sliced articles from said slicing mechanisms and conveying each of them as a unit to a wrapping machine.

17. A slicing mechanism comprising a chute for articles to be sliced, a conveyor across the path of the chute adapted to receive articles from the chute, a removable stop for normally preventing movement of the articles direct from the chute to the conveyor, slicing mechanisms, means for normally engaging the articles as they reach the stop to feed them across the stop to the slicing mechanisms, and means for feeding the articles through the slicing mechanisms to the conveyor.

WILHELM B. BRONANDER.